(12) United States Patent
Shin et al.

(10) Patent No.: US 9,846,268 B2
(45) Date of Patent: Dec. 19, 2017

(54) BACKLIGHT UNIT

(71) Applicant: Samsung Display Co., Ltd., Yongin, Gyeonggi-Do (KR)

(72) Inventors: Taek-Sun Shin, Hwaseong-si (KR); Seul-Gi Kim, Seoul (KR); Yongkyu Kang, Yongin-si (KR); Hayoung Lee, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 14/879,893

(22) Filed: Oct. 9, 2015

(65) Prior Publication Data

US 2016/0033708 A1 Feb. 4, 2016

Related U.S. Application Data

(63) Continuation of application No. 14/058,084, filed on Oct. 18, 2013, now Pat. No. 9,158,055.

(30) Foreign Application Priority Data

Jan. 10, 2013 (KR) .................. 10-2013-0003070

(51) Int. Cl.
*F21V 7/04* (2006.01)
*F21V 8/00* (2006.01)

(52) U.S. Cl.
CPC ......... *G02B 6/0016* (2013.01); *G02B 6/002* (2013.01); *G02B 6/0018* (2013.01); *G02B 6/0021* (2013.01)

(58) Field of Classification Search
CPC .............................. G02B 6/0018; G02B 6/0016
See application file for complete search history.

(56) References Cited

U.S. PATENT DOCUMENTS

| | | | |
|---|---|---|---|
| 5,709,447 A | 1/1998 | Murakami et al. |
| 6,582,095 B1 | 6/2003 | Toyoda |
| 6,597,417 B1 | 7/2003 | Veligdan |
| 6,669,350 B2 | 12/2003 | Yamashita et al. |
| 6,731,355 B2 | 5/2004 | Miyashita |
| 6,733,147 B2 | 5/2004 | Wang et al. |
| 6,761,461 B2 | 7/2004 | Mizutani et al. |
| 6,814,457 B2 | 11/2004 | Chang et al. |
| 6,913,366 B2 | 7/2005 | Lee |
| 6,985,131 B2 | 1/2006 | Kawada et al. |
| 7,048,427 B2 | 5/2006 | Fujino et al. |
| 7,088,333 B1 | 8/2006 | Manabe et al. |
| 7,101,070 B2 | 9/2006 | Yu et al. |

(Continued)

FOREIGN PATENT DOCUMENTS

| | | |
|---|---|---|
| CN | 1515937 A | 7/2004 |
| CN | 101271172 A | 9/2008 |

(Continued)

*Primary Examiner* — Evan Dzierzynski
(74) *Attorney, Agent, or Firm* — Innovation Counsel LLP

(57) ABSTRACT

A back light unit includes a light source and a light guide unit having a first surface emitting light to a display panel, a second surface facing the first surface, and a plurality of connecting surfaces connecting the first surface and the second surface. The connecting surfaces includes a first side surface, a second side surfaces and a third side surface between the first side surface and a second side surface, A first included angle of the first incident surface and the first diffusion surface is equal to or greater than about 90 degree.

8 Claims, 18 Drawing Sheets

(56) References Cited

U.S. PATENT DOCUMENTS

| | | |
|---|---|---|
| 7,273,311 B2 | 9/2007 | Yu |
| 7,357,552 B2 | 4/2008 | Takada |
| 7,357,557 B2 | 4/2008 | Miyashita |
| 7,380,969 B2 | 6/2008 | Yamashita et al. |
| 7,446,828 B2 | 11/2008 | Tamura et al. |
| 7,452,119 B2 | 11/2008 | Onishi et al. |
| 7,455,443 B2 | 11/2008 | Sakurai et al. |
| 7,507,011 B2 | 3/2009 | Ueno et al. |
| 7,517,127 B2 | 4/2009 | Takada |
| 7,527,412 B2 | 5/2009 | Lee et al. |
| 7,614,777 B2 | 11/2009 | Koganezawa et al. |
| 7,940,353 B2 | 5/2011 | Tanaka |
| 7,973,881 B2 | 7/2011 | Ochiai |
| 8,007,158 B2 | 8/2011 | Woo et al. |
| 8,199,279 B2 | 6/2012 | Choi et al. |
| 8,342,729 B2 | 1/2013 | Chang |
| 9,217,895 B2 | 12/2015 | Yeo et al. |
| 2005/0018104 A1 | 1/2005 | Lee et al. |
| 2006/0176712 A1* | 8/2006 | Takada ............. G02B 6/0016 362/612 |
| 2009/0135623 A1 | 5/2009 | Kunimochi |
| 2009/0135632 A1 | 5/2009 | Sohma |
| 2011/0279753 A1 | 11/2011 | Kim et al. |
| 2012/0057367 A1 | 3/2012 | Park |
| 2012/0182498 A1 | 7/2012 | Jung et al. |
| 2013/0003414 A1 | 1/2013 | Hong et al. |
| 2014/0307468 A1* | 10/2014 | Tseng ............... G02B 6/0016 362/608 |

FOREIGN PATENT DOCUMENTS

| | | |
|---|---|---|
| CN | 102610167 A | 7/2012 |
| EP | 2157365 A1 | 2/2010 |
| JP | 11-264974 | 9/1999 |
| JP | 1999-306831 | 11/1999 |
| JP | 2001-143512 | 5/2001 |
| JP | 2001-147431 | 5/2001 |
| JP | 2001-202816 | 7/2001 |
| JP | 2001-228475 | 8/2001 |
| JP | 2001-357714 | 12/2001 |
| JP | 2003-035824 | 2/2003 |
| JP | 2003-249111 | 9/2003 |
| JP | 2003-337332 | 11/2003 |
| JP | 2004-241323 | 8/2004 |
| JP | 2004-271871 | 9/2004 |
| JP | 2005-038750 | 2/2005 |
| JP | 2005-116268 | 4/2005 |
| JP | 2005-174567 | 6/2005 |
| JP | 2005-174706 | 6/2005 |
| JP | 2006-106074 | 4/2006 |
| JP | 2006-172785 | 6/2006 |
| JP | 2006209076 A | 8/2006 |
| JP | 2007-128788 | 5/2007 |
| JP | 2008257900 A | 10/2008 |
| KR | 10-2001-0039013 | 5/2001 |
| KR | 10-2003-0043257 | 6/2003 |
| KR | 10-2007-0040011 | 4/2007 |
| KR | 10-2011-0083872 | 7/2011 |
| KR | 10-2011-0092850 | 8/2011 |
| WO | 2006040746 A2 | 4/2006 |

* cited by examiner

BACKLIGHT UNIT

CROSS-REFERENCE TO RELATED APPLICATION

This U.S. non-provisional patent application is a continuation application of U.S. patent application Ser. No. 14/058,084 filed on Oct. 18, 2013, which claims priority under 35 U.S.C. §119 of Korean Patent Application No. 10-2013-0003070, filed on Jan. 10, 2013, the contents of which are hereby incorporated by reference in its entirety.

BACKGROUND

1. Field of Disclosure

Embodiments of the present disclosure relate to a backlight unit. More particularly, embodiments of the present disclosure relate to a backlight unit capable of reducing a light leakage.

2. Description of the Related Art

In general, a display device is classified into a transmissive type display device, a transflective type display device, and a reflective type display device. Among them, each of the transmissive type display device and the transflective type display device includes a display panel to display an image and a backlight unit to supply light to the display panel.

The backlight unit includes a light source to generate the light and a light guide unit to guide the light from the light source to the display panel.

A point light source may be used as the light source. The point light source includes a light emitting device, e.g., a light emitting diode. The light source is disposed to correspond to at least one incident surface of the light guide unit.

A portion of the light incident into the light guide unit through the incident surface is lost. Thus, efficiency of the backlight unit may be deteriorated.

SUMMARY

The present disclosure provides a backlight unit having high light efficiency.

Embodiments of the inventive concept provide a backlight unit including a light source each emitting light, and a light guide unit that includes a first surface emitting light to a display panel, a second surface facing the first surface, and a plurality of connecting surfaces connecting the first surface and the second surface, the light guide unit guide the light from the light source to the display panel, the connecting surfaces comprising a first side surface extending in a first direction, a second side surface facing the first side surface, a third side surface extending in a second direction substantially perpendicular to the first direction; and a first incident surface disposed between the first side surface and the third side surface, the first incident surface receiving the light from the light source and including at least one first serration pattern having a first diffusion surface and a second diffusion, the second diffusion surface being closer to the third side surface than the first diffusion surface.

A first included angle of the first incident surface and the first diffusion surface may be equal to or greater than about 90. The first included angle may be equal to or smaller than 120 degree.

The first included angle of the first incident angle and the first diffusion surface may be equal to or smaller than 117 degree.

The at least one first serration pattern may be provide in a plural number and a second included angle of the first incident surface and the second diffusion surface of one of the first serration patterns may be differ from a second included angle of the first incident surface and the second diffusion surface of other one of the first serration patterns.

Each of the first serration patterns may further include a third diffusion surface disposed between the first diffusion surface and the second diffusion surface and the third diffusion surface may be substantially parallel to the first incident surface.

The first serration patterns may be spaced apart each other.

The second included angle surface may be equal to or greater than about 35 degree and equal to or smaller than 60 degree.

The at least one first serration pattern may include two serration patterns, the at least one first serration pattern further includes a portion of the first incident surface disposed between two first serration patterns.

Embodiments of the inventive concept provide a backlight unit including a light source emitting a light, and a light guide unit that includes a first surface, a second surface facing the first surface, and a plurality of connecting surfaces connecting the first surface and the second surface to guide the light from the light source. The connecting surfaces may include a first side surface extending in a first direction, a second side surface facing the first side surface, a third side surface that extends in a second direction crossing the first direction, a first incident surface disposed between the first side surface and the third side surface, receiving the light from the light source, and including at least one first serration pattern having a first diffusion surface and a second diffusion surface. The first incident surface may define a first included angle with respect to an extension surface of the third side surface. A second included angle of the first diffusion surface with respect to the first incident surface may be in a range determined by the following Equation, and a third included angle of the second diffusion surface with respect to the first incident surface may be smaller than the second included angle, $$90 \leq \theta_2 \leq 90 + \theta_1, \quad \text{Equation}$$

where $\theta_2$ denotes the second included angle and $\theta_1$ denotes the first included angle. The first included angle may be greater than about 20 degrees and smaller than about 30 degrees.

The back light unit may further include a second incident surface disposed between the second side surface and the third side surface, receiving the light from the light source, and including at least one second serration pattern, The first incident surface may have a shape symmetrical with a shape of the second incident surface when viewed in a plan view.

The first serration pattern may further comprise a third diffusion surface disposed between the first diffusion surface and the second diffusion surface.

The first serration pattern may be provided in a plural number.

Any one of the first serration patterns may have a shape different from a shape of another one of the first serration patterns when viewed in a plan view.

An included angle between the third side surface and the second diffusion surface of each of the any one of the first serration patterns and the another one of the first serration patterns may be equal to or greater than about 35 degrees and equal to or smaller than about 60 degrees.

The display panel receives the light from the light guide unit. The effective light emitting area of the light guide unit corresponds to the display area of the display panel. The light guide unit provides the uniform light to the display area. The light guide unit having the improved light efficiency provides the light with high brightness to the display panel. Therefore, the display device may improve the display quality of the image displayed thereon.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
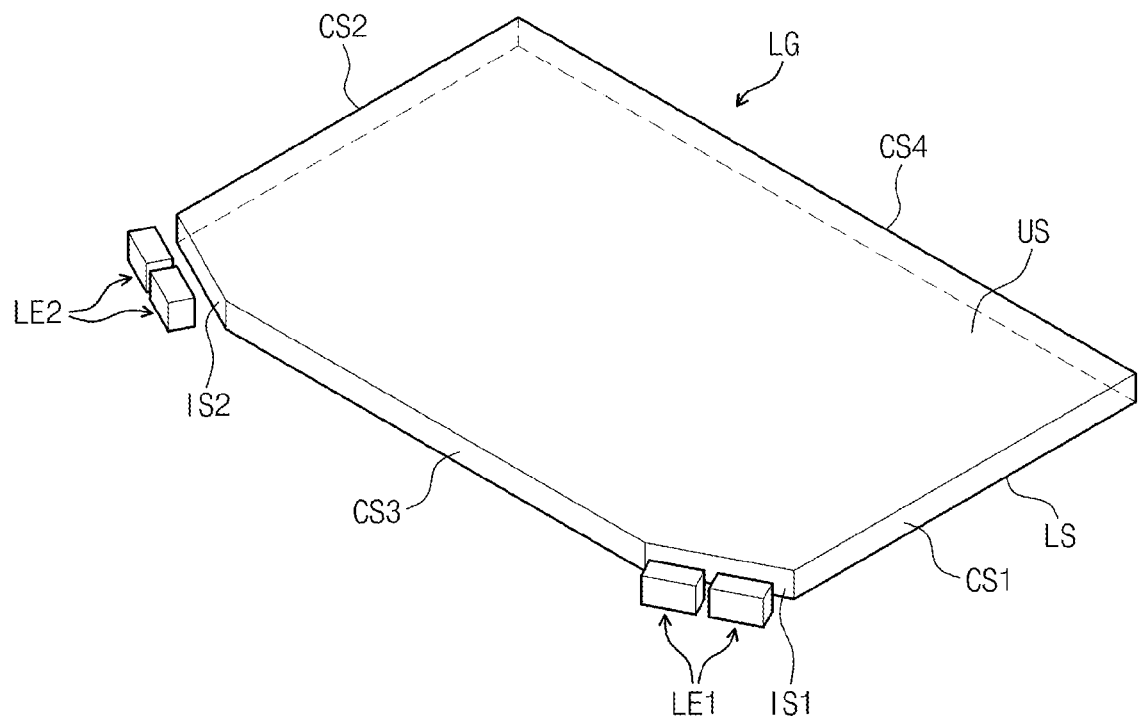
FIG. 1 is a perspective view showing a backlight unit according to an exemplary embodiment of the present disclosure.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 2:
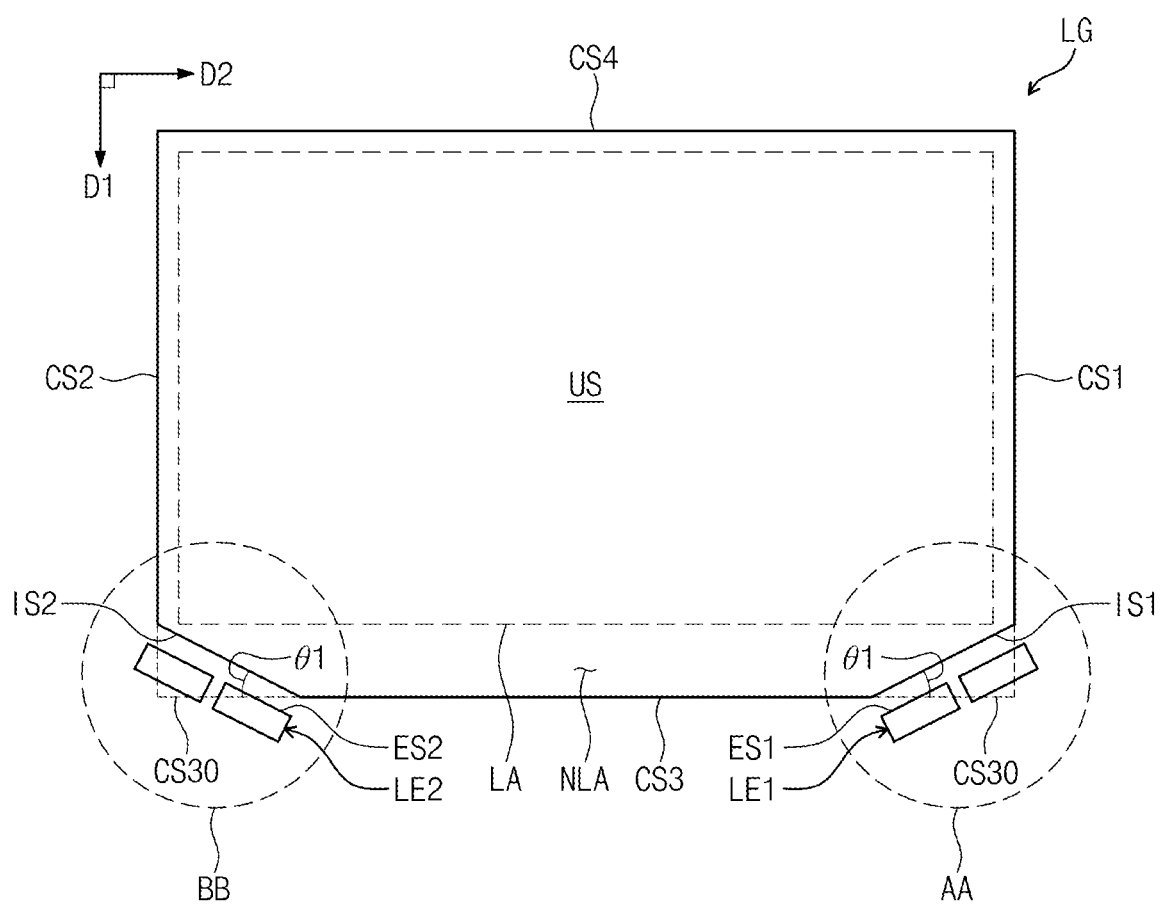
FIG. 2 is a plan view showing a backlight unit shown in FIG. 1.
Figure 3:
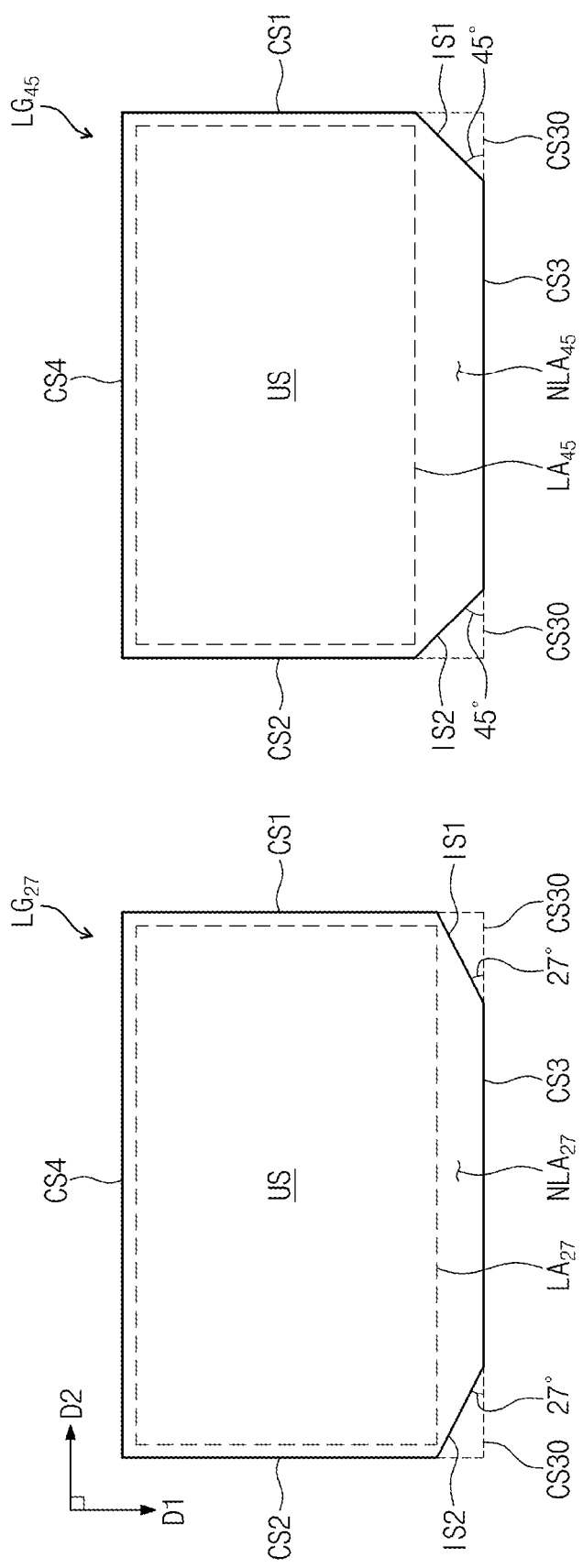
FIG. 3 is a plan view showing an effective light emitting area of a light guide unit according to a first included angle.

FIG. 1 is a perspective view showing a backlight unit according to an exemplary embodiment of the present disclosure, FIG. 2 is a plan view showing a backlight unit shown in FIG. 1, and FIG. 3 is a plan view showing an effective light emitting area of a light guide unit according to a first included angle.

Referring to FIGS. 1 and 2, the backlight unit includes a light source that emits light and a light guide unit LG that receives the light from the light source and guides the light.

The backlight unit includes a first light source LE1 and a second light source LE2. The first light source LE1 and the second light source LE2 provide the light to different areas of the light guide unit LG. Each of the first and the second light sources LE1 and LE2 includes two light emitting devices. The number of the light emitting devices should not be limited to two in each of the first and the second light sources LE1 and LE2. In addition, the light emitting device may be, but not limited to, a light emitting diode.

The light guide unit LG includes a first surface US, a second surface LS, and a plurality of connecting surfaces IS1, IS2, and CS1 to CS4 that connect the first surface US and the second surface LS.

As shown in FIGS. 1 and 2, the light guide unit LG has a rectangular plate shape in which two corner portions thereof are cut away, but the shape of the light guide unit LG should not be limited to the rectangular plate shape. The two cut-away corner portions will be referred to as a first light incident area AA and a second light incident area BB, respectively. The first light incident area AA and the second light incident area BB respectively receive the lights from the first light source LE1 and the second light source LE2. The number of the cut-away corner portions should not be limited to two. The number of the cut-away corner portions may be four formed at all the four corners of the rectangular plate. The number of the cut-away corner portions may be one formed at one corner of the rectangular plate. That is, one of the first light incident area AA and the second light incident area BB may be omitted.

The light incident into the first light incident area AA and the second light incident area BB exits from the first surface US, and thus hereinafter the first surface US is referred to as a light exit surface. The second surface LS faces the light exit surface US in a thickness direction of the light guide unit LG. Hereinafter, the second surface LS is referred to as an opposite surface.

The connecting surfaces IS1, IS2, and CS1 to CS4 include a first incident surface IS1, a second incident surface IS2, and at least three side surfaces. FIGS. 1 and 2 show the light guide unit LG having first, the second, the third, and the fourth side surfaces CS1, CS2, CS3, and CS4.

The first and the second side surfaces CS1 and CS2 extend in a first direction D1. The first and the second side surfaces CS1 and CS2 are spaced apart from each other and face each other. The third side surface CS3 extends in a second direction D2 crossing the first direction D1. The fourth side surface CS4 faces the third side surface CS3 and connects the first side surface CS1 and the second side surface CS2. The second direction D2 may be substantially perpendicular to the first direction D1. Hereinafter, the following description will be described under the condition that the first direction D1 and the second direction D2 are perpendicular to each other.

The first incident surface IS1 and the second incident surface IS2 are respectively disposed in the first light incident area AA and the second light incident area BB. The first incident surface IS1 faces the first light source LE1 and the second incident surface IS2 faces the second light source LE2.

The first light source LE1 includes a first light emitting surface ES1 facing the first incident surface IS1 and the second light source LE2 includes a second light emitting surface ES2 facing the second incident surface IS2. The light which is generated in the first light source LE1 and the second light source LE2 comes out through the first light emitting surface ES1 and the second light emitting surface ES2.

As shown in FIG. 2, the first light emitting surface ES1 and the second light emitting surface ES2 is parallel to the first incident surface IS1 and the second incident surface IS2, respectively. In other embodiment of the present disclosure, at least one of the first light emitting surface ES1 and the second light emitting surface ES2 may be not parallel to corresponding light emitting surface. In detail, the first incident surface IS1 is disposed between the first side surface CS1 and the third side surface CS3. The first incident surface IS1 connects the first side surface CS1 and the third side surface CS3. The second incident surface IS2 is disposed between the second side surface CS2 and the third side surface CS3. The second incident surface IS2 connects the second side surface CS2 and the third side surface CS3.

However, the connections of the connecting surfaces IS1, IS2, and CS1 to CS4 should not be limited to the above-mentioned connections. That is, additional surfaces may be disposed between the first incident surface IS1 and the first side surface CS1 or between the first incident surface IS1 and the third side surface CS3, and additional surfaces may be disposed between the second incident surface IS2 and the second side surface CS2 or between the second incident surface IS2 and the third side surface CS3.

Referring to FIG. 2, the light guide unit LG includes an effective light emitting area LA and a peripheral area NLA. Here, the effective light emitting area LA corresponds to a display area of a display panel (not shown). In other words, the effective light emitting area LA is a minimum area required to generate an effective image in the display panel.

When the effective light emitting area LA of the light guide unit LG is smaller than the display area of the display panel, a display quality of the effective image is degraded. The brightness of the effective image depends on positions in the display area. For instance, the image displayed on the edge portion of the display area has brightness lower than brightness of the image displayed in a center portion of the display area.

The peripheral area NLA corresponds to and overlaps with a non-display area of the display panel (not shown). The image is not displayed in the non-display area. The effective light emitting area LA is surrounded by the peripheral area NLA.

The effective light emitting area LA of the light guide unit LG is varied depending on the arrangement of the first incident surface IS1 and the second incident surface IS2. The first and the second incident surfaces IS1 and IS2 are inclined with respect to the third side surface CS3. As shown in FIG. 2, each of the first and the second incident surfaces IS1 and IS2 is inclined with respect to an extension surface CS30 of the third side surface CS3 at a first included angle θ1.

The first included angle θ1 is greater than about 20 degrees and smaller than about 30 degrees. When the first included angle θ1 is equal to or smaller than about 20 degrees, the brightness of the effective light emitting area LA in the center portion and in the edge portion becomes non-uniform. This is because the light incident to the first and the second incident surfaces IS1 and IS2 has angles with respect to the first side surface CS1 and the second side surface CS2, respectively.

When the first included angle θ1 is equal to or greater than about 30 degrees, the light guide unit LG has a relatively smaller effective light emitting area LA. FIG. 3 shows a first light guide unit $LG_{27}$ having the first included angle θ1 of about 27 degrees and a second light guide unit $LG_{45}$ having the first included angle θ1 of about 45 degrees with respect to the third side surface. The area of the effective light emitting area $LA_{45}$ of the second light guide unit $LG_{45}$ is smaller than the area of the effective light emitting area $LA_{27}$ of the first light guide unit $LG_{27}$. The second light guide unit $LG_{45}$ provides the light with a relatively non-uniform brightness to the display area as compared to the first light guide unit $LG_{27}$.

Therefore, the first included angle θ1 is required to be in a range from about 20 degrees to about 30 degrees, preferably in a range greater than about 24 degrees and smaller than about 27 degrees, in order to provide the light with the uniform brightness throughout the effective light emitting area LA.

Meanwhile, according to another embodiment, the included angle between the first incident surface IS1 and the extension surface CS30 of the third side surface CS3 may be different from the included angle between the second incident surface IS2 and the extension surface CS30 of the third side surface CS3.

Figure 4A:
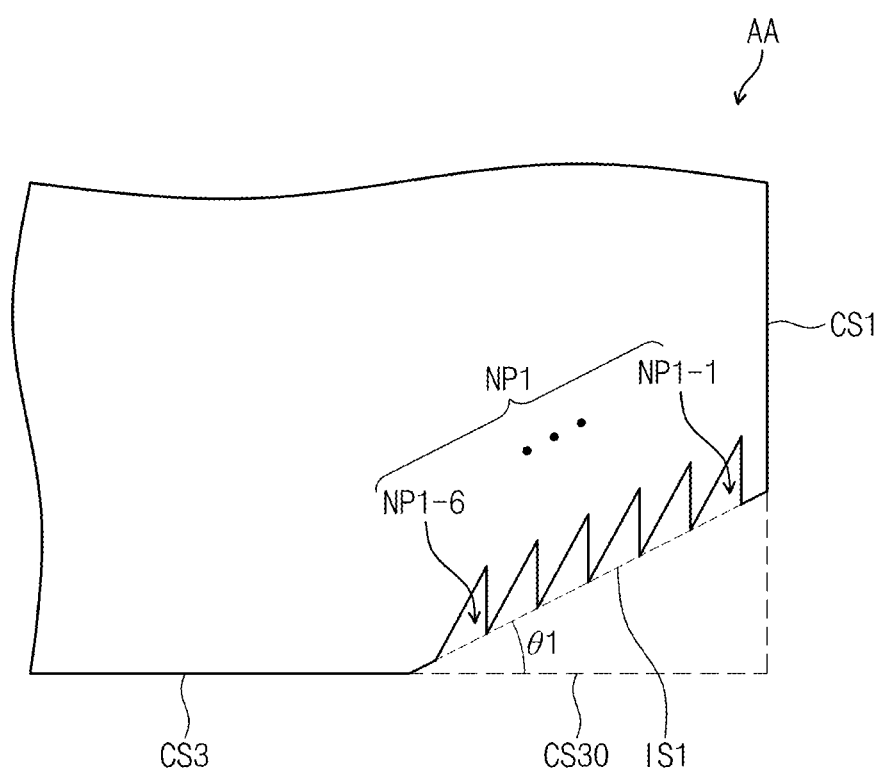
FIGS. 4A and 4B are plan views showing a first light incident area and a second light incident area shown in FIG. 2, respectively.
Figure 4B:
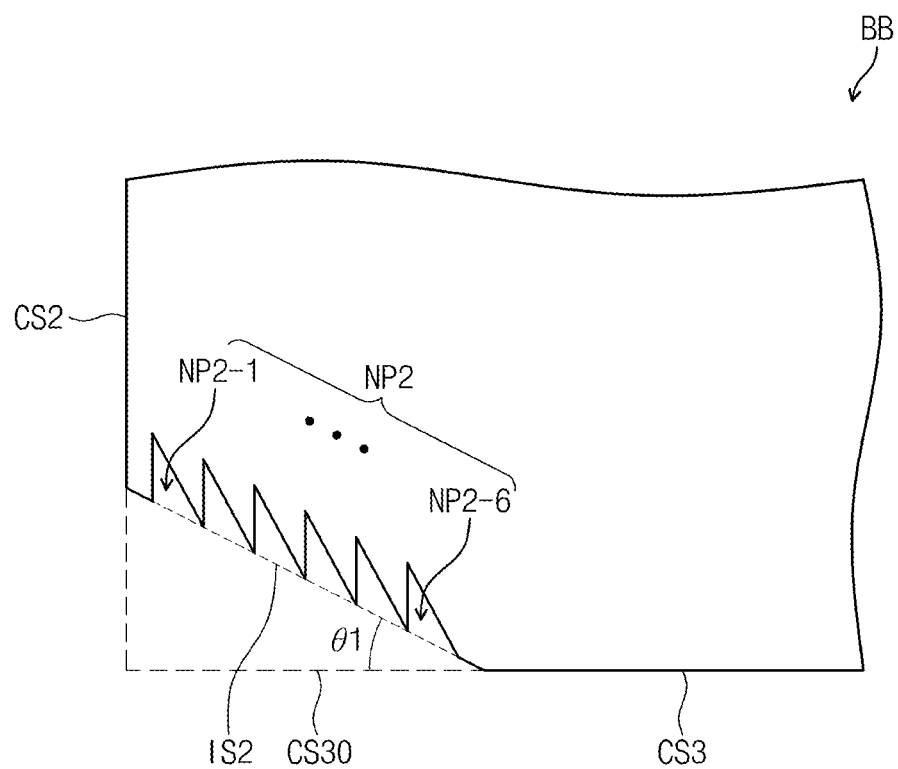
Figure 5A:
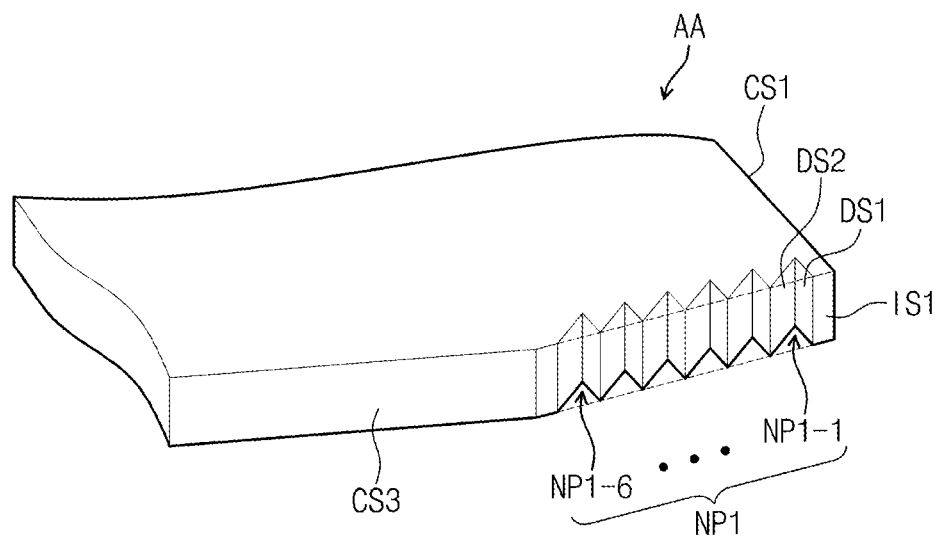
FIGS. 5A and 5B are perspective views respectively showing the first and the second light incident areas shown in FIGS. 4A and 4B.
Figure 5B:
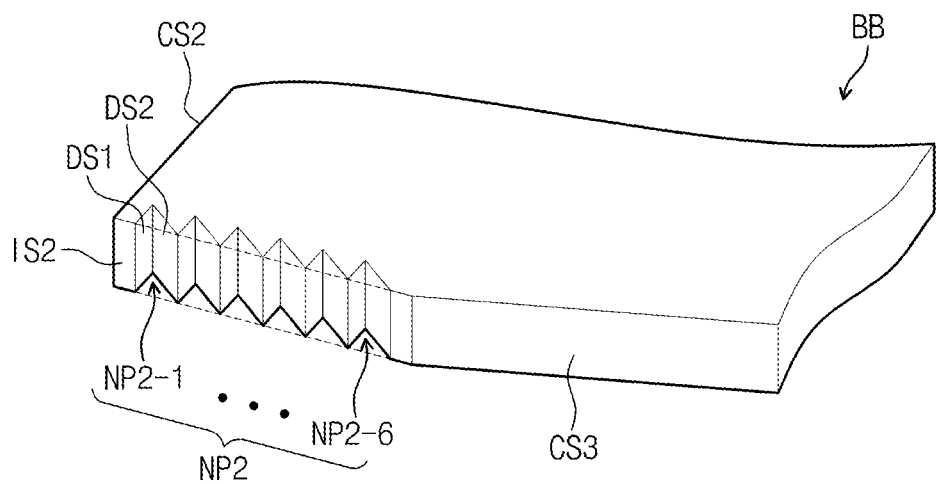

FIGS. 4A and 4B are plan views showing the first light incident area and the second light incident area shown in FIG. 2, respectively, and FIGS. 5A and 5B are perspective views respectively showing the first and the second light incident areas shown in FIGS. 4A and 4B.

At least one first serration pattern NP1 is formed in the first incident surface IS1, and at least one second serration pattern NP2 is formed in the second incident surface IS2. The at least one first serration pattern NP1 is disposed in the first light incident area AA (refer to FIG. 2), the at least one second serration pattern NP2 is disposed in the second light incident area BB (refer to FIG. 2).

The first serration pattern NP1 includes grooves formed in the first incident surface IS1 and the second serration pattern NP2 includes grooves formed in the second incident surface IS2. The first serration pattern NP1 and the second serration pattern NP2 may have a sawtooth.

Hereinafter, the first serration patterns NP1 and the second serration patterns NP2 will be described in detail. FIGS. 4A, 4B, 5A, and 5B show the first incident surface IS1 in which first serration patterns NP1 are arranged and the second incident surface IS2 in which second serration patterns NP2 are arranged. The first serration patterns NP1 may include six first serration patterns NP1-1 to NP1-6 and the second serration patterns NP2 may include six second serration patterns NP2-1 to NP2-6. The number of each of the first serration patterns NP1 and the second serration patterns NP2 should not be limited to six.

Referring to FIGS. 4A, 4B, 5A, and 5B, the first and second incident surfaces IS1 and IS2 are symmetrical with each other when viewed on the light exit surface US. Hereinafter, the first incident surface IS1 will be described in detail. Meanwhile, the second incident surface IS2 may have the same shape as the first incident surface IS1, but it should not be limited thereto or thereby.

As shown in FIGS. 4A and 5A, each of the first serration patterns NP1-1 to NP1-6 includes a first diffusion surface DS1 and a second diffusion surface DS2. The first diffusion surface is closer to the first side surface or the second side surface than the second diffusion surface. Each of the first serration patterns NP1-1 to NP1-6 is a triangular prism shape.

The first diffusion surface DS1 diffuses a portion of the light incident to the first incident surface IS1 to allow the portion of the light to travel to the first side surface CS1. The second diffusion surface DS2 diffuses the other portion of the light incident to the first incident surface IS1 to allow the other portion of the light to travel to the second side surface CS2 (refer to FIG. 2).

Referring to FIGS. 4A and 5A, the first serration patterns NP1-1 to NP1-6 have the same shape when viewed on the light exit surface US. The first diffusion surface of any one of the first serration patterns NP1-1 to NP1-6 is connected to the second diffusion surface of another one of the first serration patterns, which is adjacent to the any one of the first serration patterns NP1-1 to NP1-6. For instance, the first diffusion surface DS1 of the second first-serration pattern NP1-2 of the first serration patterns NP1-1 to NP1-6 is directly connected to the second diffusion surface DS2 of the first-serration pattern NP1-1 adjacent to a right side of the second first-serration pattern NP1-2.

Figure 6:
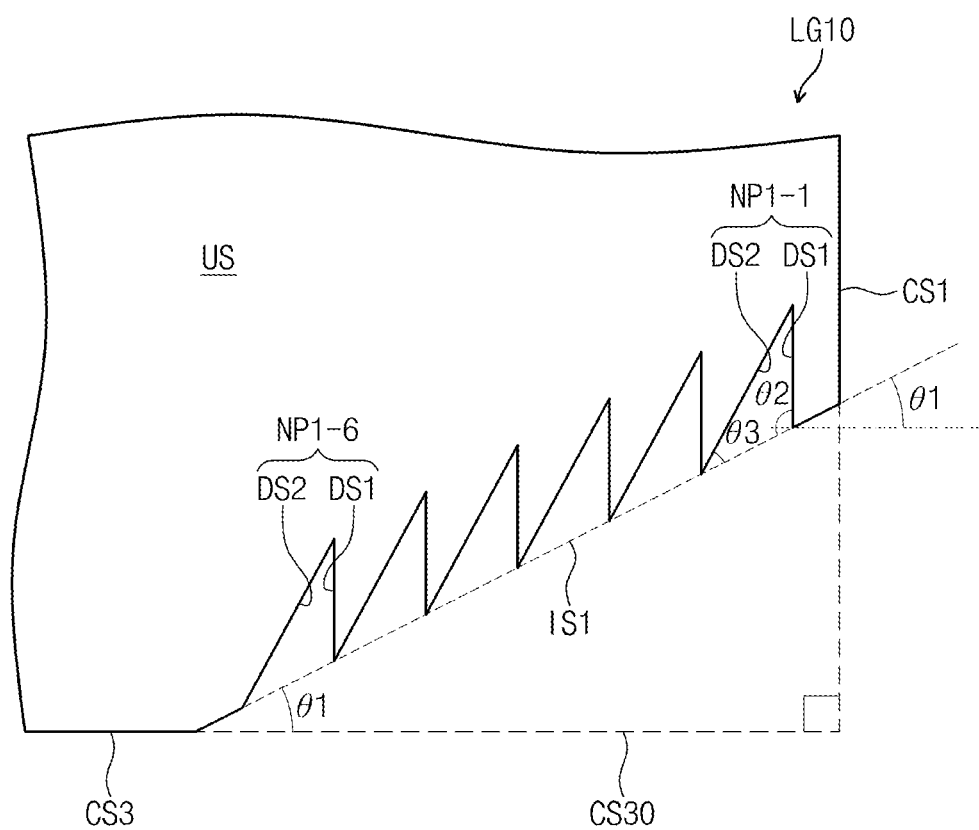
FIG. 6 is a plan view showing a first light incident area according to an exemplary embodiment of the present disclosure.
Figure 7:
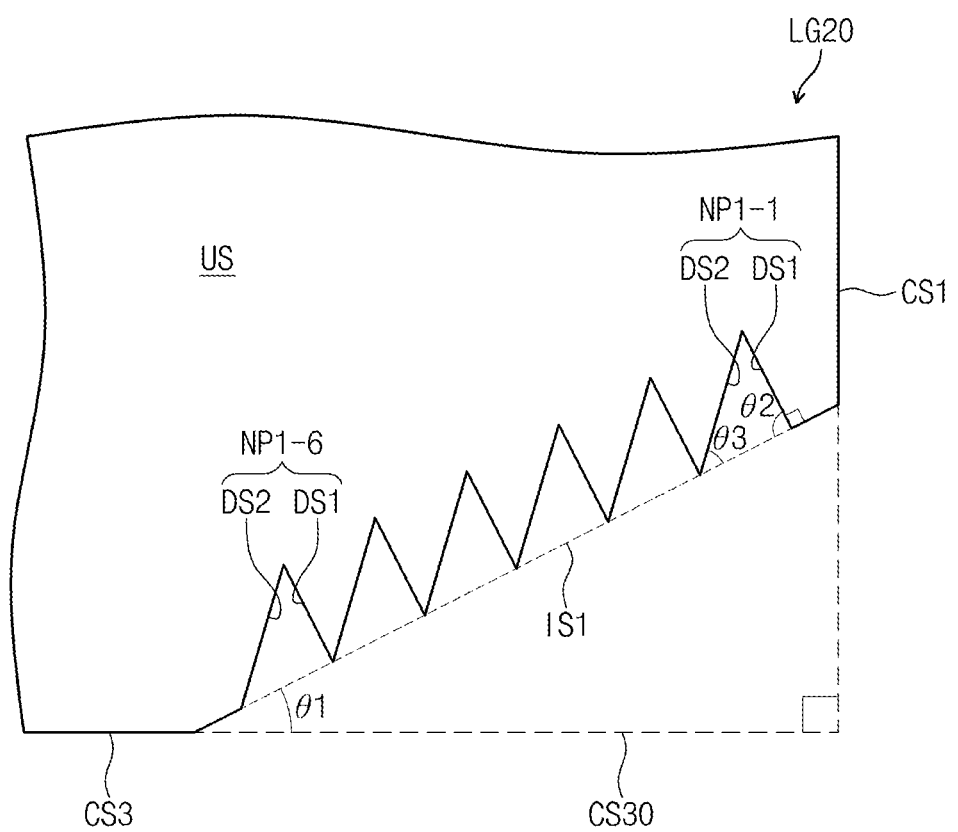
FIG. 7 is a plan view showing a first light incident area according to an exemplary embodiment of the present disclosure.
Figure 8A:
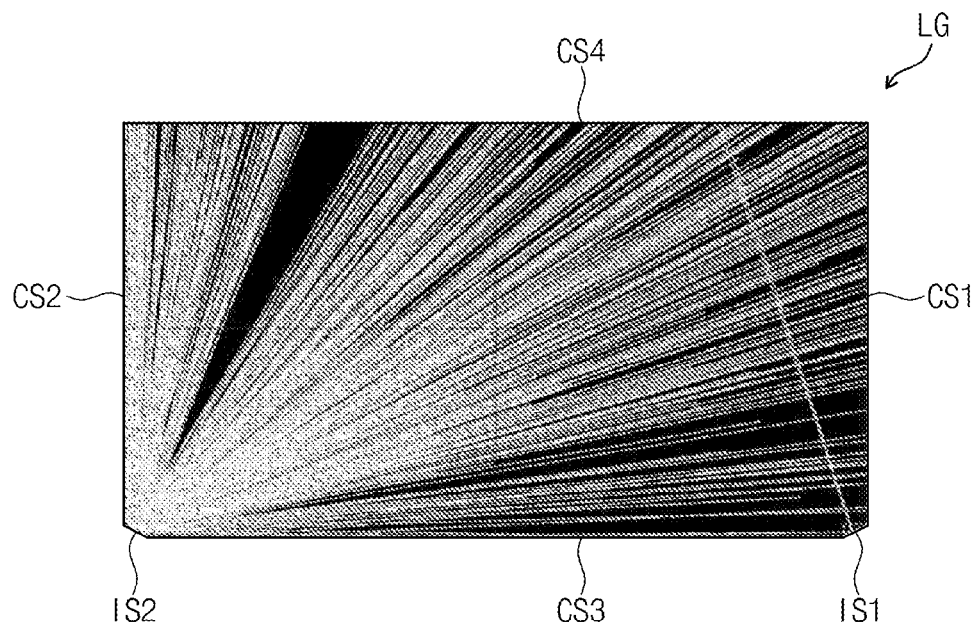
FIGS. 8A and 8B are views showing a distribution of light according to a serration pattern.
Figure 8B:
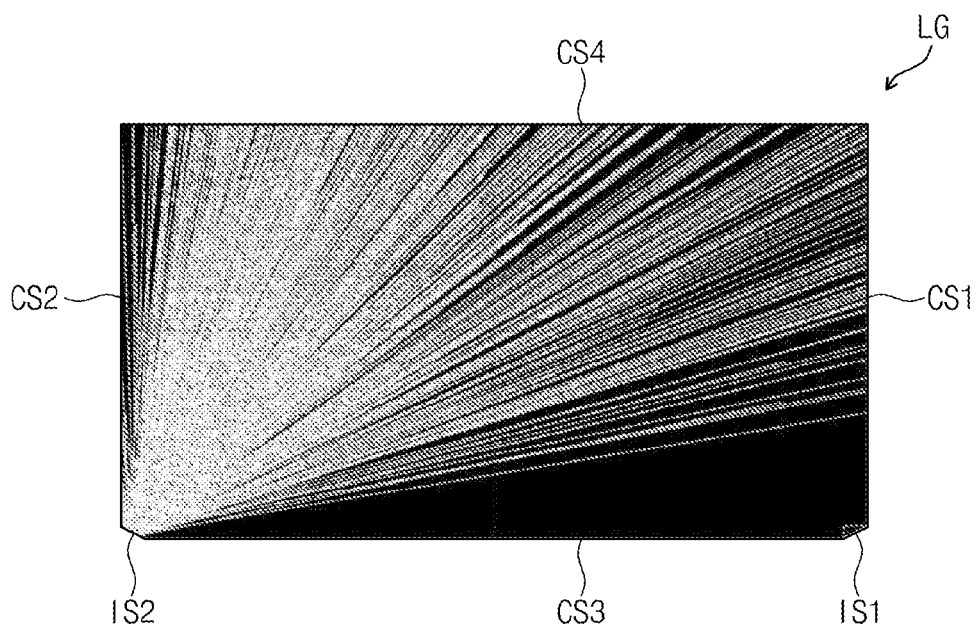

FIG. 6 is a plan view showing the first light incident area according to an exemplary embodiment of the present disclosure, FIG. 7 is a plan view showing the first light incident area according to an exemplary embodiment of the present disclosure, and FIGS. 8A and 8B are views showing a distribution of light according to a serration pattern.

Referring to FIGS. 6 and 7, the first diffusion surface DS1 forms a second included angle θ2 with respect to the first incident surface IS1 and the second diffusion surface DS2 forms a third included angle θ3 with respect to the first incident surface IS1. The second included angle θ2 is different from the third included angle θ3.

The maximum value of the second included angle θ2 is shown in FIG. 6. In this case, the first diffusion surface DS1 is substantially parallel to the first side surface CS1. The maximum value of the second angle θ2 may be a 90 degree plus the first angle θ1. The first diffusion surface DS1 parallel to the first side surface CS1 prevents the light incident to the first incident surface IS1 from being diffused to the first side surface CS1. When the maximum value of the second included angle θ2 is greater than that shown in FIG. 6, a difference between the brightness of the light exiting from the center portion of the effective light emitting area LA (refer to FIG. 2) and the brightness of the light exiting from the edge portion of the effective light emitting area LA (refer to FIG. 2) increases. This is because a difference between an amount of the light diffused to the first side surface CS1 and an amount of the light diffused to the center portion of the light guide unit LG is increased. That is, when the maximum value of the second included angle θ2 is greater than that shown in FIG. 6, the light provided to the display panel becomes non-uniform according to the areas of the display area of the display panel.

The minimum value of the second included angle θ2 is shown in FIG. 7. In this case, the first diffusion surface DS1 is substantially vertical to the first incident surface IS1. The first diffusion surface DS1 vertical to the first incident surface IS1 diffuses the light incident to the first incident surface IS1 to the first side surface CS1. When the minimum value of the second included angle θ2 is smaller than that shown in FIG. 7, a portion of the light diffused to the first side surface CS1 is leaked through the first side surface CS1, and the amount of the light leaked through the first side surface CS1 is greater than a critical amount of the light leakage for maintaining appropriate uniformity of light intensity throughout the display. That is, when the minimum value of the second included angle θ2 is smaller than that shown in FIG. 7, the light efficiency of the light guide unit LG is reduced.

The range of the second included angle θ2 is determined by the following Equation.

$$90\ \text{degree} \leq \text{second included angle}(\theta 2) \leq 90\ \text{degree} + \text{first included angle}(\theta 1), \quad \text{Equation}$$

where the first included angle (θ1) is equal to or greater than 20 degree and equal to or less than 30 degree. Preferably, the first included angle (θ1) is equal to or greater than 24 degree and equal to or less than 27 degree.

When the second included angle θ2 satisfies the range determined by the Equation, the third included angle θ3 has an acute angle smaller than the second included angle θ2.

FIGS. 8A and 8B show a traveling path of the light incident through the second incident surface IS2. FIG. 8A shows the traveling path of the light incident to the second serration patterns having the same second and third included angles θ2 and θ3, which are the same acute angle, and FIG. 8B shows the traveling path of the light incident to the light guide unit according to the present exemplary embodiment. The light guide unit having the traveling path of the light shown in FIG. 8B includes the second serration patterns having the second included angle θ2 determined by the Equation and the third included angle θ3 smaller than the second included angle θ2.

The amount of the light leaked through the second side surface CS2 of the light guide unit having the traveling path shown in FIG. 8A is greater than that of the light leaked through the second side surface CS2 of the light guide unit having the traveling path shown in FIG. 8B. Thus, the light efficiency of the light guide unit shown in FIG. 8A is lower than the light efficiency of the light guide unit shown in FIG. 8B. The light guide unit having the traveling path shown in FIG. 8B may provide the light to the display panel, which is enough to generate the effective image.

FIGS. 9 to 13 are plan views showing first light incident areas according to another exemplary embodiment of the present disclosure. In FIGS. 9 to 13, detailed descriptions of the same elements as those shown in FIGS. 1 to 8B are omitted.

Figure 9:
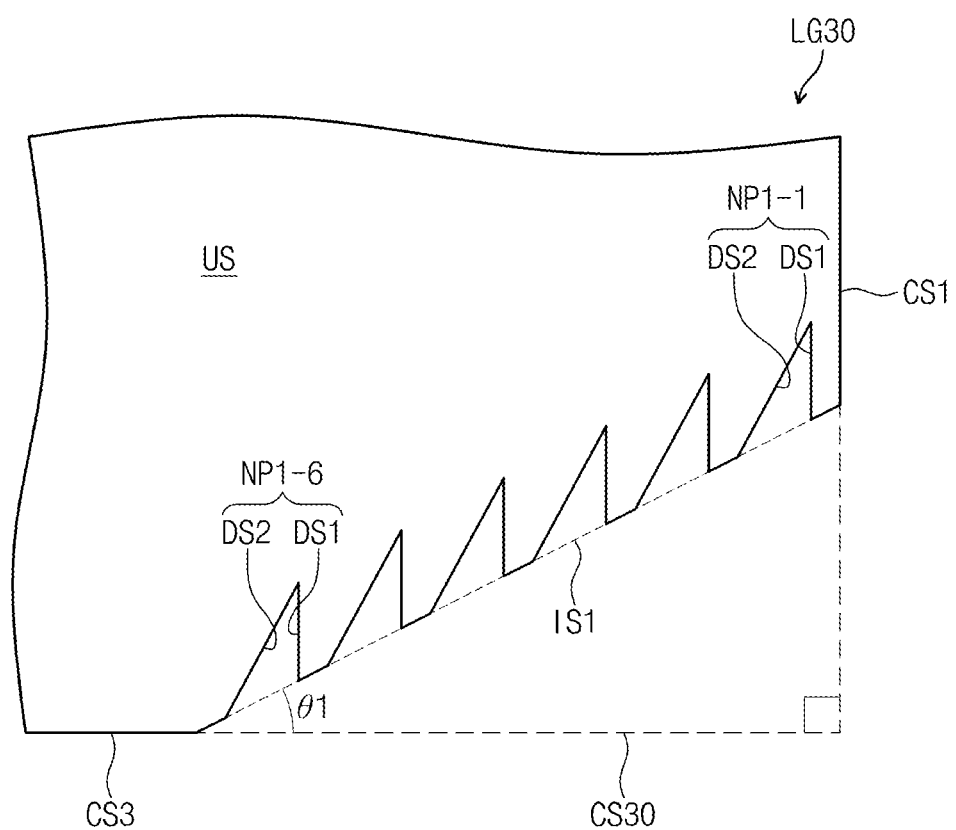
FIGS. 9, 10, 11, 12, and 13 are plan views showing first light incident areas according to exemplary embodiments of the present disclosure.
Figure 11:
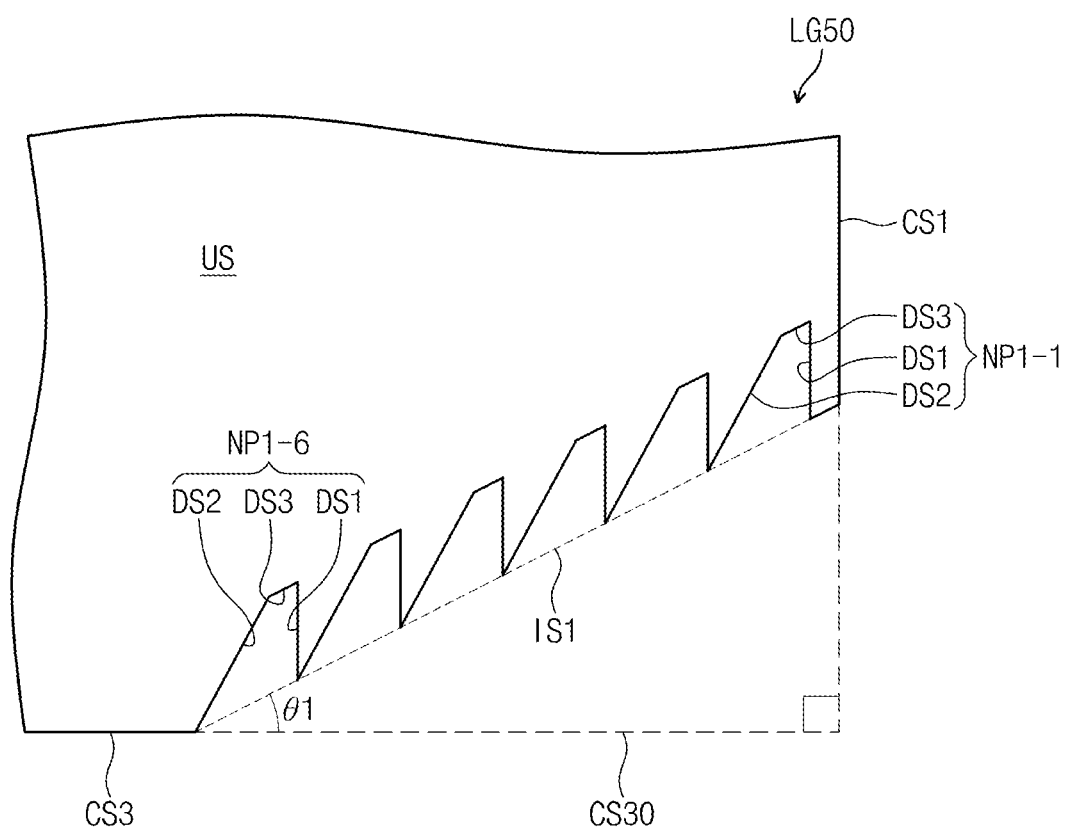

Referring to FIGS. 9 and 11, each of first serration patterns NP1-1 to NP1-6 includes a first diffusion surface DS1 and a second diffusion surface DS2. The first serration patterns NP1-1 to NP1-6 have the same shape when viewed on the light exit surface US.

The first serration patterns NP1-1 to NP1-6 of a light guide unit LG30 shown in FIG. 9 are spaced apart from each other at regular intervals. A portion of the first incident surface IS1 is disposed between two first serration patterns adjacent to each other among the first serration patterns NP1-1 to NP1-6.

Figure 10:
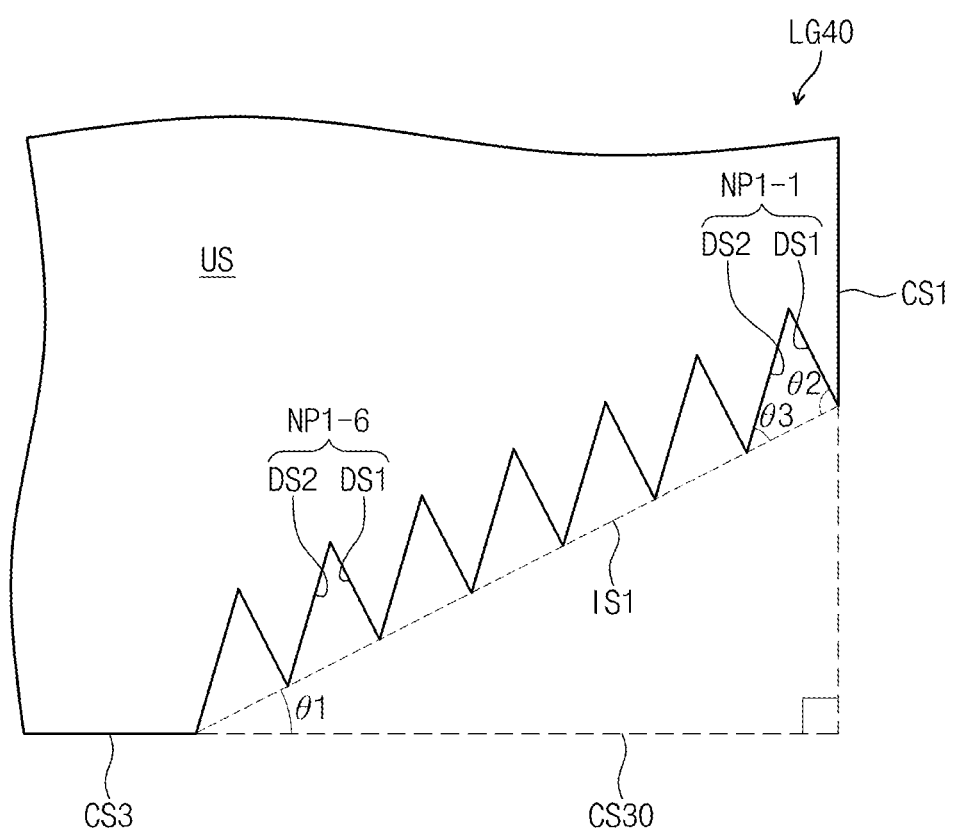

The first diffusion surface of any one of the first serration patterns NP1-1 to NP1-6 of a the light guide unit LG40 shown in FIG. 10 is connected to the second diffusion surface of another one of the first serration patterns NP1-1 to NP1-6, which is adjacent to the any one of the first serration patterns NP1-1 to NP1-6. For instance, the first diffusion surface DS1 of the second first-serration pattern NP1-2 of the first serration patterns NP1-1 to NP1-6 is directly connected to the second diffusion surface DS2 of the first-serration pattern NP1-1 adjacent to a right side of the second first-serration pattern NP1-2.

In addition, the first diffusion surface DS1 of the first-serration pattern of the first serration patterns NP1-1 to NP1-6 is directly connected to the first side surface CS1 and the second diffusion surface DS2 of the last first-serration pattern of the first serration patterns NP1-1 to NP1-6 is directly connected to the third side surface CS3. For example, the first diffusion surface DS1 of the first-serration pattern of the first serration patterns NP1-1 to NP1-6 is directly connected to the first side surface CS1 and the second diffusion surface DS2 of the sixth first-serration pattern of the first serration patterns NP1-1 to NP1-6 is directly connected to the third side surface CS3.

Each of the first serration patterns NP1-1 to NP1-6 of a light guide unit LG50 shown in FIG. 11 further includes a third diffusion surface DS3 disposed between the first diffusion surface DS1 and the second diffusion surface DS2. The third diffusion surface DS3 is substantially in parallel to the first incident surface IS1. The first serration patterns NP1-1 to NP1-6 of a light guide unit LG50 shown in FIG. 11 may further includes the portion of the first incident surface IS1 disposed between two first serration patterns adjacent to each other among the first serration patterns NP1-1 to NP1-6.

However, the shape of the third diffusion surface DS3 should not be limited thereto or thereby. For instance, the third diffusion surface DS3 forms a predetermined angle with respect to the first incident surface IS1. In addition, the third surface DS3 has a two-dimensional curved shape when viewed on the light exit surface US.

Meanwhile, different from the first serration patterns shown in FIG. 11, only a portion of the first serration patterns NP1-1 to NP1-6 may further include the third diffusion surface DS3 in the light guide unit according to another exemplary embodiment.

Figure 12:
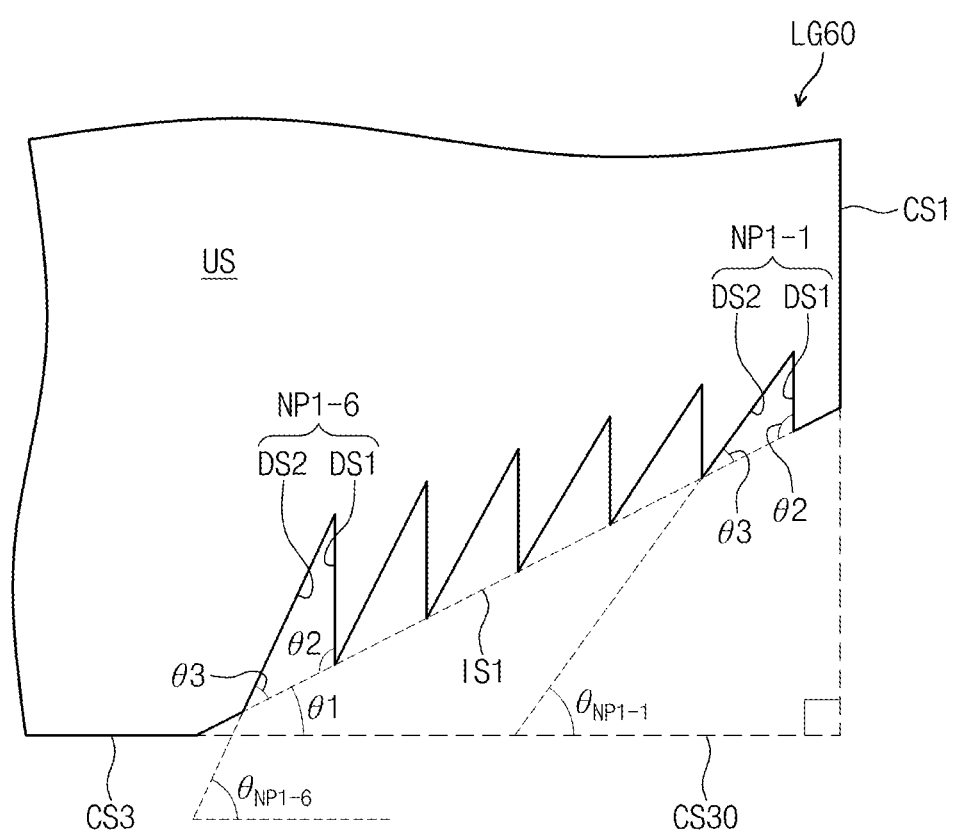
Figure 13:
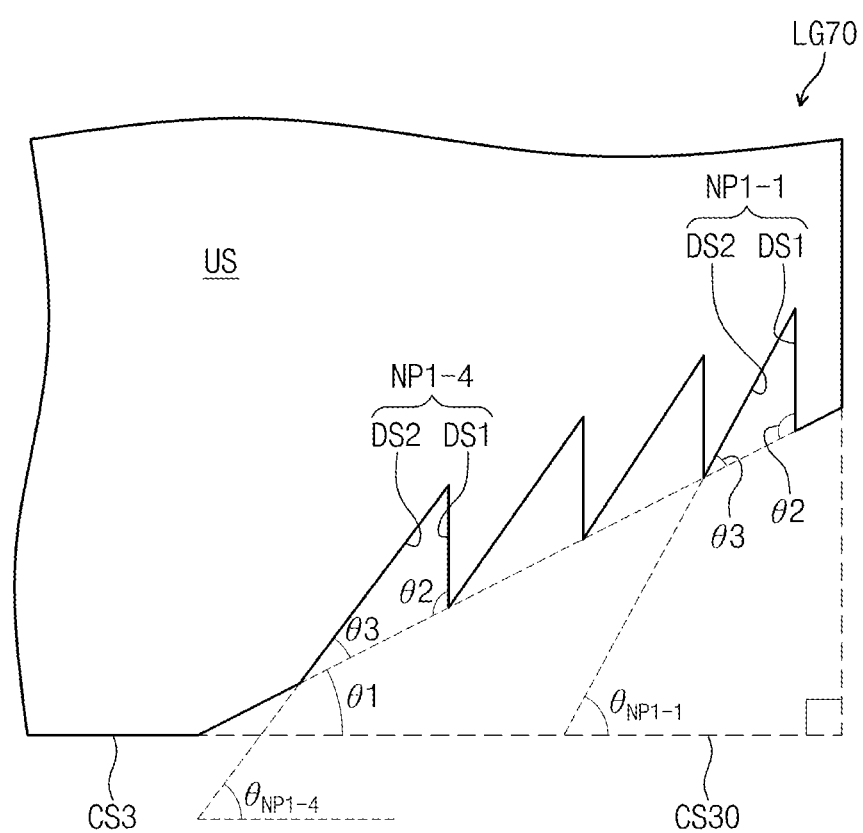

Referring to FIGS. 12 and 13, first serration patterns having different shapes from each other are formed in the first incident surface IS1. FIG. 12 shows the first incident surface IS1 in which six first serration patterns NP1-1 to NP1-6 are arranged and FIG. 13 shows the first incident surface IS1 in which four first serration patterns NP1-1 to NP1-4 are arranged.

The first serration patterns NP1-1 to NP1-6 of a light guide unit LG60 shown in FIG. 12 have the same second included angle θ2 and different third included angles θ3 from each other. As shown in FIG. 12, the third included angle θ3 gradually increases from the first-serration patterns NP1-1 to the sixth first-serration pattern NP1-6 among the first serration patterns NP1-1 to NP1-6. In this case, areas of the first diffusion surfaces DS1 of the first serration patterns NP1-1 to NP1-6 are different from each other and the second diffusion surfaces DS2 of the first serration patterns NP1-1 to NP1-6 are different from each other.

As shown in FIG. 12, the second diffusion surfaces DS2 of the first serration patterns NP1-1 to NP1-6 are inclined with respect to the third side surface CS3. The second diffusion surfaces DS2 of the first serration patterns NP1-1 to NP1-6 form different included angles with respect to the extension surface CS30 of the third side surface CS3.

Among the first serration patterns NP1-1 to NP1-6, an included angle $\theta_{NP1-1}$ between the second diffusion surface DS2 of the first-serration pattern NP1-1 and the extension surface CS30 of the third side surface CS3 has the minimum value among included angles between the second diffusion surfaces DS2 and the extension surface CS30. In addition, an included angle $\theta_{NP1-6}$ between the second diffusion surface DS2 of the sixth first-serration pattern NP1-6 and the extension surface CS30 of the third side surface CS3 has the maximum value among the included angles between the second diffusion surfaces DS2 and the extension surface CS30.

The included angle $\theta_{NP1-1}$ between the second diffusion surface DS2 of the first-serration pattern NP1-1 and the extension surface CS30 of the third side surface CS3 is greater than about 35 degrees. The included angle $\theta_{NP1-6}$ between the sixth diffusion surface DS6 of the sixth first-serration pattern NP1-6 and the extension surface CS30 of the third side surface CS3 is smaller than about 60 degrees.

The first serration patterns NP1-1 to NP1-4 of a light guide unit LG80 shown in FIG. 13 have the same second included angle θ2 and different third included angles θ3 from each other. As shown in FIG. 13, the third included angle θ3 gradually decreases from the first-serration patterns NP1-1 to the fourth first-serration pattern NP1-4 among the first serration patterns NP1-1 to NP1-4. In this case, areas of the first diffusion surfaces DS1 of the first serration patterns NP1-1 to NP1-4 are the same and the second diffusion surfaces DS2 of the first serration patterns NP1-1 to NP1-4 are different from each other.

Among the first serration patterns NP1-1 to NP1-4, an included angle $\theta_{NP1-1}$ between the second diffusion surface DS2 of the first-serration pattern NP1-1 and the extension surface CS30 of the third side surface CS3 has the maximum value among included angles between the second diffusion surfaces DS2 and the extension surface CS30. In addition, an included angle $\theta_{NP1-4}$ between the second diffusion surface DS2 of the fourth first-serration pattern NP1-4 and the extension surface CS30 of the third side surface CS3 has the minimum value among the included angles between the second diffusion surfaces DS2 and the extension surface CS30.

Although not shown in figures, the second included angles θ2 of the first serration patterns NP1-1 to NP1-4 may be different from each other in the range determined by the Equation.

FIGS. 14A to 14F are plan views showing light guide units according to exemplary embodiments of the present disclosure. In FIGS. 14A to 14F, detailed descriptions of the same elements as those shown in FIGS. 1 to 13 will be omitted.

Figure 14A:
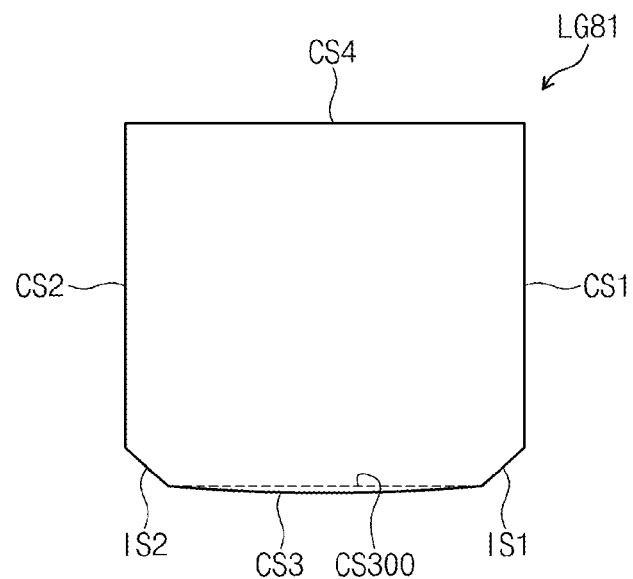
FIGS. 14A, 14B, 14C, 14D, 14E, and 14F are plan views showing light guide units according to exemplary embodiments of the present disclosure.

Referring to FIG. 14A, a third side surface CS3 of a light guide unit LG82 may be a circular arc surface. Accordingly, the extension surface CS30 (refer to FIG. 4) of the third side surface CS3 may be extended from a surface CS300 connected between sides disposed at both ends of the third side surface CS3. Different from the third side surface CS3 shown in FIG. 14A, the third side surface CS3 may be a concave circular arc surface.

Figure 14B:
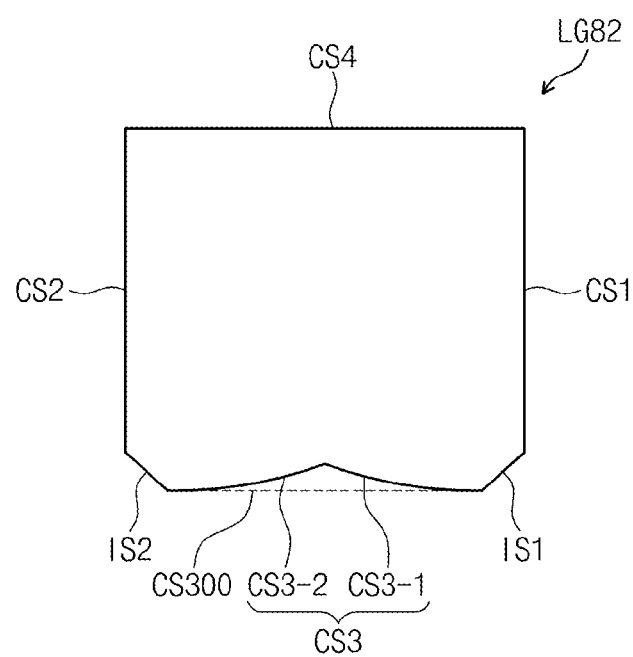

Referring to FIG. 14B, a third side surface CS3 of a light guide plate LG82 includes a first circular arc surface CS3-1 and a second circular arc surface CS3-2. The first circular arc surface CS3-1 is connected to the first incident surface IS1 and the second circular arc surface CS3-2 is connected to the second incident surface IS2.

Figure 14C:
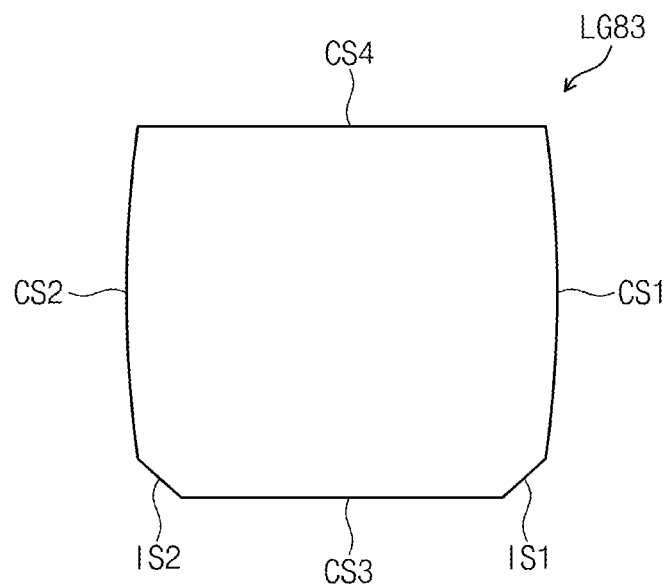

Referring to FIG. 14C, each of first and second side surfaces CS1 and CS2 of a light guide unit LG83 may be the circular arc surface.

Figure 14D:
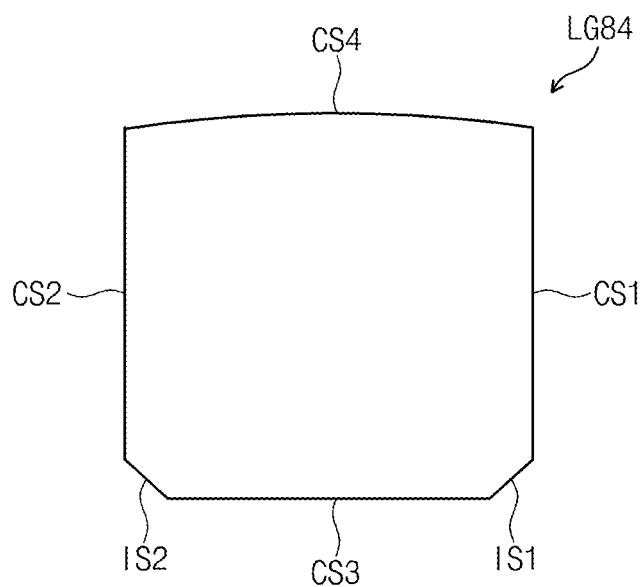

Referring to FIG. 14D, a fourth side surface CS4 of a light guide unit LG84 may be a circular arc surface. According to embodiment, the first, second, and fourth side surfaces CS1, CS2, and CS4 may be a circular arc surface.

Figure 14E:
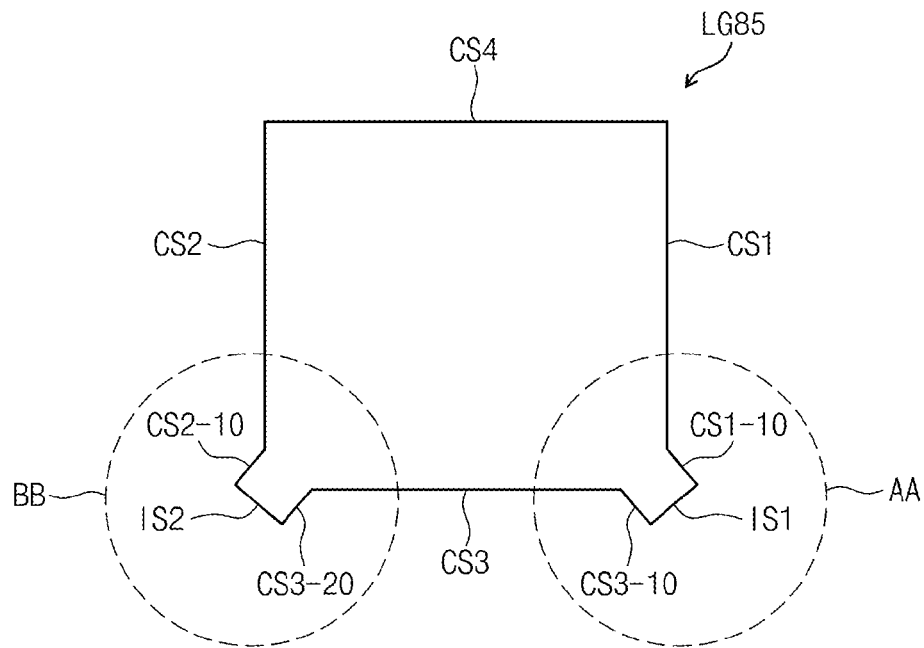

Referring to FIG. 14E, a first light incident area AA and a second light incident area BB of a light guide unit LG85 may be convex from the light exit surface US when viewed in a plan view. Auxiliary surfaces CS1-10 and CS3-10 are disposed between the first incident surface IS1 and the first side surface CS1 and between the first incident surface IS1 and the third side surface CS3, respectively. In addition, auxiliary surfaces CS2-10 and CS3-20 are disposed between the second incident surface IS2 and the second side surface CS2 and between the second incident surface IS2 and the third side surface CS3, respectively.

Figure 14F:
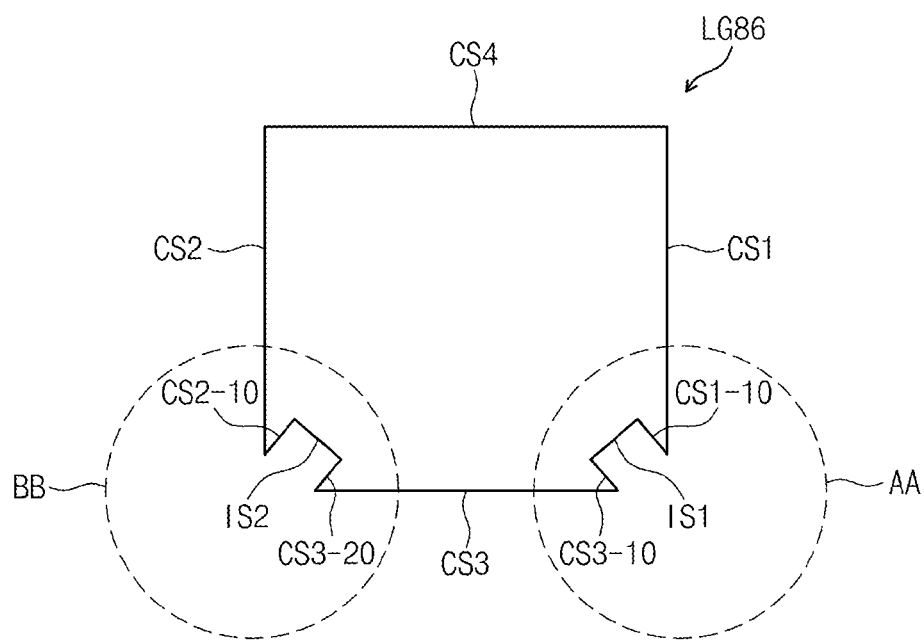

Referring to FIG. 14F, a first light incident area AA and a second light incident area BB of a light guide unit LG86 may be concaved from the light exit surface US when viewed in a plan view. Auxiliary surfaces CS1-10 and CS3-10 are disposed between the first incident surface IS1 and the first side surface CS1 and between the first incident surface IS1 and the third side surface CS3, respectively. In addition, auxiliary surfaces CS2-10 and CS3-20 are disposed between the second incident surface IS2 and the second side surface CS2 and between the second incident surface IS2 and the third side surface CS3, respectively.

Figure 15:
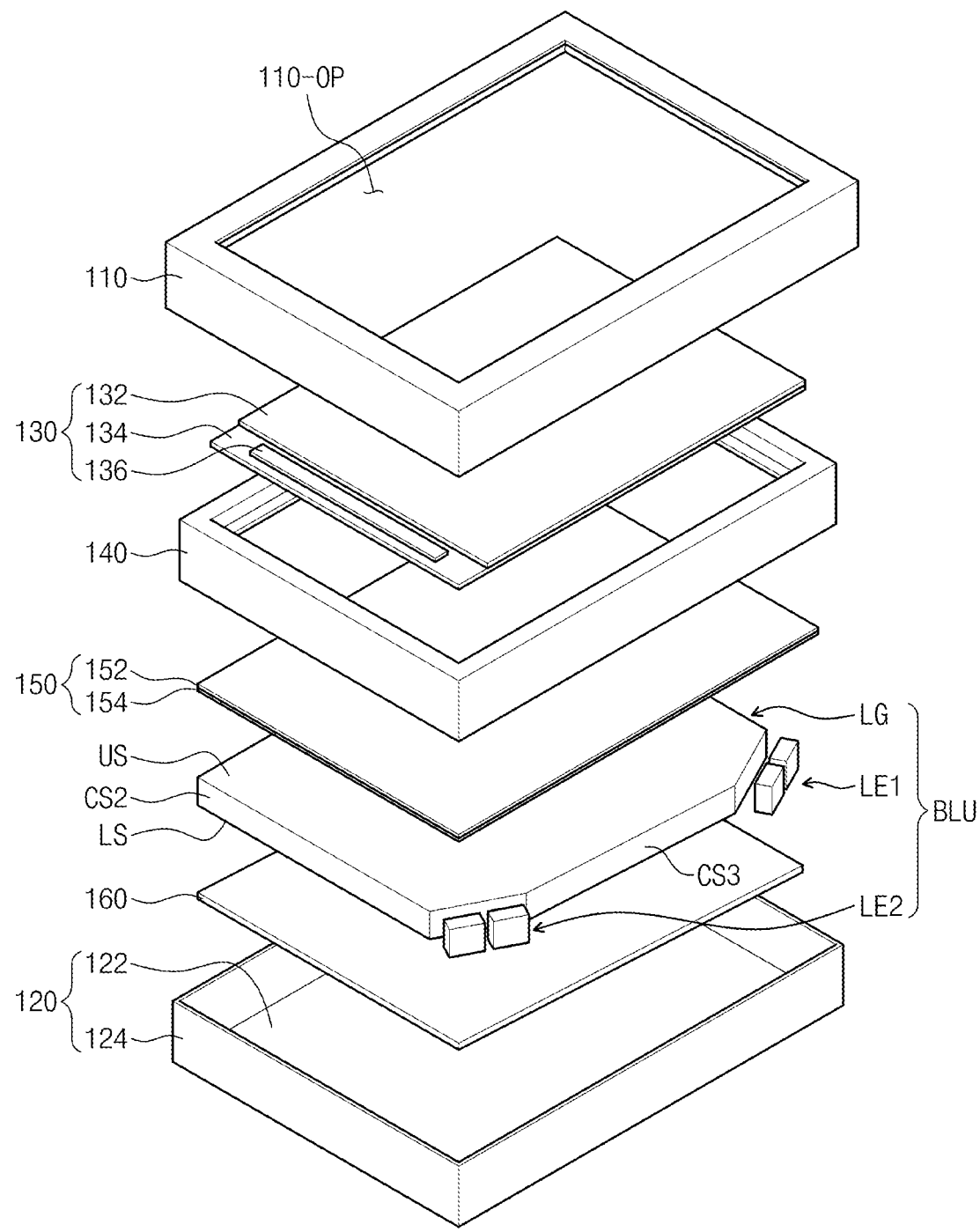
FIG. 15 is an exploded perspective view showing a display device according to an exemplary embodiment of the present disclosure.

FIG. 15 is an exploded perspective view showing a display device according to an exemplary embodiment of the present disclosure.

Referring to FIG. 15, the display device includes an upper protective member 110, a lower protective member 120, a display panel 130, a support member 140, and a backlight unit BLU.

The upper protective member 110 and the lower protective member 120 form an outer surface of the display device. The upper protective member 110 and the lower protective member 120 are coupled to each other to accommodate other elements of the display device therein.

The upper protective member 110 is disposed on the display panel 130. The upper protective member 110 is provided with an opening portion 110-OP formed therethrough to expose a portion of the display panel 130. The upper protective member 110 covers the non-display area of the display panel 130.

The lower protective member 120 is disposed under the backlight unit BLU. The lower protective member 120 includes a bottom portion 122 and a sidewall portion 124 bent upward from the bottom portion 122. The backlight unit BLU is accommodated in a space defined by the bottom portion 122 and the sidewall portion 124.

The display panel 130 displays an image. The display panel 130 is a transmissive or transflective type display panel. For instance, the display panel 130 is a liquid crystal display panel or an electrophoretic display panel. In the present exemplary embodiment, the liquid crystal display panel that includes a first substrate 132 and a second substrate 134 will be described as the display panel 130.

The first substrate 132 includes a plurality of pixel electrodes (not shown) and a plurality of thin film transistors (not shown) each being electrically connected to a corresponding pixel electrode of the pixel electrodes. The second substrate 134 includes a common electrode (not shown). A liquid crystal layer is disposed between the first substrate 132 and the second substrate 134. When an electric field generated between the common electrode and the pixel electrodes is controlled, the light from the backlight unit is switched, and different images from each other are generated in accordance with the switching of the pixel electrodes.

A driving chip 136 is mounted on a side portion of the second substrate 134 to apply a driving signal to the display panel 130. The driving chip 136 includes a data driver and a gate driver.

The support member 140 has a rectangular frame shape to overlap with the non-display area of the display panel 130. The support member 140 is provided with an opening portion formed therethrough. The support member 140 is disposed under the display panel 130 and supports the display panel 130.

The backlight unit BLU includes a first light source LE1, a second light source LE2, which emit the light, and a light guide unit LG that guides the light to the display panel 130. The backlight unit BLU may include the light guide unit shown in FIGS. 1 to 14F.

The display device further includes an optical sheet 150 and a reflection sheet 160 in order to improve the efficiency of the light provided to the display panel 130.

The optical sheet 150 is disposed between the light guide unit LG and the display panel 130. The optical sheet 150 includes a prism sheet 154 and a protection sheet 152, which are sequentially stacked on the light guide unit LG.

The prism sheet 154 condenses the light exiting from the light exit surface US of the light guide unit US and passing therethrough in a direction vertical to the surface of the display panel 130. The light passing through the prism sheet 154 are vertically incident into the display panel 130. The protection sheet 152 is disposed on the prism sheet 154 to protect the prism sheet 154 from external impacts.

Meanwhile, although not shown in figures, the optical sheet 150 further includes a diffusion sheet to diffuse the light exiting from the light exit surface US of the light guide unit LG. As an example, the diffusion sheet may be disposed between the light guide unit LG and the prism sheet 154.

The reflection sheet 160 is disposed under the light guide unit LG. The reflection sheet 160 reflects the light leaked through the opposite surface LS of the light guide unit LG such that the leaked light is incident into the light guide unit LG again.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A display device comprising:
a display panel; and
a backlight unit configured to provide a light to the display panel,
wherein the backlight unit comprising:
a light source emitting the light; and
a light guide unit that includes a first surface, a second surface facing the first surface, and a plurality of connecting surfaces connecting the first surface and the second surface, the connecting surfaces comprising:
a plurality of side surfaces;
a first incident surface disposed in a corner area of the light guide unit; and
a plurality of diffusion surfaces disposed in the corner area of the light guide unit,
wherein the plurality of diffusion surfaces has a first diffusion surface and a second diffusion surface,
the first incident surface and the plurality of diffusion surfaces define a polygon in a plan view, and
a first interior angle of the polygon defined by the first incident surface and the first diffusion surface is greater than 90 degree and is equal to or smaller than 120 degree, and
a second interior angle of the polygon defined by the first incident surface and the second diffusion surface is smaller than the first interior angle.

2. The display device of claim 1, wherein the plurality of side surfaces includes a first side surface and a second side surface,
the first incident surface disposed between the first side surface and the second side surface, and
the first diffusion surface is closer to the first side surface than the second diffusion surface.

3. The display device of claim 2, wherein the first side surface and the second side surface are substantially perpendicular to each other.

4. The display device of claim 2, wherein the first diffusion surface and the second diffusion surface are connected to each other.

5. The display device of claim 4, wherein the first diffusion surface and the second diffusion surface define a serration pattern, and
the first diffusion surface and the second diffusion surface are provided in a plural number, respectively.

6. The display device of claim 2, wherein the plurality of diffusion surfaces further comprises a third diffusion surface disposed between the first diffusion surface and the second diffusion surface.

7. The display device of claim 2, wherein the second interior angle is equal to or greater than about 35 degree and equal to or smaller than 60 degree.

8. A display device comprising:
a display panel; and
a backlight unit configured to provide a light to the display panel,
wherein the backlight unit comprising:
a light source emitting the light; and
a light guide unit that includes a first surface, a second surface facing the first surface, and a plurality of connecting surfaces connecting the first surface and the second surface, the connecting surfaces comprising:
a plurality of side surfaces;
a first incident surface disposed in a corner area of the light guide unit; and
a plurality of diffusion surfaces disposed in the corner area of the light guide unit,
wherein the plurality of diffusion surfaces has a first diffusion surface and a second diffusion surface,
the first incident surface and the plurality of diffusion surfaces define a polygon in a plan view,
the plurality of side surfaces includes a first side surface and a second side surface,
the first incident surface disposed between the first side surface and the second side surface, and
the first diffusion surface is closer to the first side surface than the second diffusion surface, and,
wherein the first diffusion surface and the first side surface are substantially parallel to each other.

* * * * *